Patented Aug. 8, 1939

2,168,327

UNITED STATES PATENT OFFICE 2,168,327

REVIVIFICATION OF SPENT ADSORBENTS

Henry C. Cowles, Jr., and Arthur B. Hersberger, Philadelphia, Pa., assignors to The Atlantic Refining Company, Philadelphia, Pa., a corporation of Pennsylvania No Drawing. Application May 8, 1937,
Serial No. 141,578

2 Claims. (Cl. 252—2)

The present invention relates to the treatment of decolorizing adsorbents, and relates particularly to the revivification of adsorbents such as decolorizing clay or fuller's earth which have been employed in the treatment of hydrocarbon oils.

A principal object of this invention is the removal of adsorbed coloring matter, polymers and oil from the adsorbent clay or earth and the rejuvenation of the adsorbent and decolorizing qualities thereof, such rejuvenation or revivification being effected by means of an organic solvent containing ammonia, preferably in the anhydrous state.

A further object of this invention is the revivification of decolorizing adsorbents by means of an organic solvent-ammonia mixture, in conjunction with a second solvent which is substantially immiscible with said organic solvent-ammonia mixture, whereby the solvents, and oil which may be contained in the adsorbent, are not substantially contaminated with one another, and the recovery of the solvents by distillation is reduced to a minimum.

A further object of this invention is the revivification of decolorizing adsorbents, employed in the treatment of hydrocarbon oils, with a minimum quantity of solvent, and preferably without removal of the adsorbent from the filtering means.

It has been generally recognized that the coloring element in hydrocarbon oil consists of asphaltic material which is finely dispersed therein, and when filtering such oils to improve the color, the asphalt-like material is selectively adsorbed on the surface and in the pores of the filter medium. The action of the decolorizing earths and clays is not, however, limited to merely adsorbing coloring materials but, in many cases, extends to a polymerization of unstable, unsaturated compounds present in the oils and the subsequent adsorption of the polymers formed in this way.

In the case of decolorizing earths of the type of fuller's earth which have been used in the treatment of petroleum oils and which have become spent, the adsorbed polymers, asphaltic coloring matters and oil are removed by subjecting the earth to a treatment in which it is burned in a rotary kiln. This burning treatment may be preceded by a naphtha washing and steaming. In the course of the burning operation, the adsorbed materials present in the pores and on the surface of the earth are partially removed by the combined distilling and oxidizing effects of the burning.

It has been found that a considerable portion of the adsorbed material present in the pores of the decolorizing earth becomes carbonized and, as a result, the decolorizing and adsorptive efficiency of the clay is considerably less than its original efficiency. It is thus apparent that after several recoveries the clay will have deteriorated to such an extent as to be of no further use in decolorizing or treating oil.

Although the method of heating or burning, which has just been described, is used in the revivification of fuller's earth, it is entirely unsatisfactory for rejuvenating certain types of clay which now find wide use in the treatment of hydrocarbon oils. These clays are sometimes spoken of as activated clays or acid treated clays, since it is found that in their natural condition they have little or no decolorizing or adsorptive power but, when treated with acid, develop an active structure and, in many cases, are many times more active than the ordinary fuller's earth. In the case of these acid treated clays, revivification can not be effected by means of burning or heating since the active structure is extremely susceptible to destruction under high temperature conditions and, in most cases where the spent acid treated clays are subjected to a heat treatment, the clays instead of being revived, are rendered useless.

The revivification of decolorizing earth both of the class of fuller's earth as well as of the activated clays may be accomplished with much greater efficiency by dissolving out the adsorbed polymers, coloring matters and oils by means of a solvent which has no harmful effect upon the structure of the clay itself.

We have found that adsorbents such as spent fuller's earth or clay may be revivified most economically by treating the adsorbent containing the impurities first with a solvent which is capable of displacing or replacing the adsorbed impurities and then with a second solvent which is capable of dissolving said displaced impurities, the primary or replacing solvent being of such character as to be substantially immiscible with the secondary solvent and with oil which may be contained in the adsorbent. The primary or replacing solvents include media such as methyl, ethyl, propyl and butyl alcohols containing ammonia in quantities of the order of 2%, 5%, 10% or more, preferably but not necessarily in the anhydrous state. The lower aliphatic alcohols are generally not miscible to substantial extent with viscous hydrocarbon oils, but such miscibility may be further decreased by the addition of small quantities of water, for example, of the order of 1% to 5%. Ketones such as acetone, methyl ethyl ketone and the like containing ammonia, and, if desired, a small quantity of water, may also be employed as the primary or replacing solvent. The secondary solvent or media for dissolving the displaced impurities may include the light hydrocarbon mixtures such as petroleum naphtha or gasoline; carbon disulfide; benzene; carbon tetrachloride; ethylene dichloride; ethyl ether; dichloro ethyl ether and the like.

While we prefer to employ the primary solvent and secondary solvent, successively, in the revivification of spent adsorbents, a mixture of the primary and secondary solvents may be employed simultaneously but less advantageously.

In the revivification of adsorbents such as fuller's earth or clay employed in the percolation filtration of hydrocarbon oil, it is desirable, from an economic standpoint, to effect the solvent revivification of the adsorbent in the same vessel in which the oil filtration or treatment was carried on. In other words, the revivification is preferably effected "in situ", thus eliminating the expense and labor of removing spent adsorbent from the filtration vessel and recharging of the filter with revivified adsorbent. When the solvent treatment is effected "in situ", the direction of flow of the immiscible primary and secondary solvents is governed, in general, by the specific gravities of the solvents. For example, when it is desirable to employ methyl or ethyl alcohol containing ammonia as the primary solvent and ethylene dichloride as the secondary solvent, the primary solvent may be introduced either at the top or bottom of the filter, while the secondary solvent, being the heavier, is preferably introduced at the bottom of the filter. In the event that the primary and secondary solvents are of about the same specific gravity, and both are of greater specific gravity than the oil which may be contained in the spent adsorbent, both solvents are preferably introduced at the bottom of the filter. Or, when the specific gravities of the primary and secondary solvents are of the same order, and both are of less specific gravity than the oil which may be contained in the spent adsorbent, both solvents are preferably introduced at the top of the filter. Thus, the point of introduction and the direction of flow of the immiscible solvents is chosen so as to preserve gravitational stability or equilibrium and to prevent substantial admixing or contamination of the oil which may be contained in the spent adsorbent with the solvents and/or dissolved impurities.

In carrying out our revivification process the spent adsorbent material, preferably contained in the filter or other vessel in which the treatment of hydrocarbon oil has been effected, may be treated first with a primary solvent such as methyl alcohol containing ammonia and then with a secondary solvent such as petroleum naphtha to remove the primary solvent and the displaced impurities.

For example, a hydrocarbon oil requiring decolorization may be diluted with petroleum naphtha and filtered through a bed of adsorbent clay until the maximum yield of filtered oil of a specified color is obtained. The filtration operation is then discontinued and a quantity of a primary solvent such as methyl alcohol containing 5% of dry ammonia is admitted at the top of the clay bed while the oil remaining in the bed is permitted to drain from the bottom thereof. The methyl alcohol-ammonia solution, in passing downwardly through the clay bed, displaces residual oil and color-bodies or adsorbed impurities from the clay. The quantity of alcohol-ammonia solution employed may be equal to, or more or less than, the quantity of oil retained in the clay bed at the completion of the initial filtration operation. After the retained oil has been displaced from the clay bed and the bed wetted with the alcohol-ammonia solution, a quantity of secondary solvent such as petroleum naphtha is admitted at the top of the bed, while the alcohol-ammonia solution is withdrawn from the bottom thereof. In this manner the major portion of the alcohol-ammonia solution is displaced from the clay bed, and the color-bodies or impurities are dissolved in the secondary solvent, i. e., the naphtha. In order that the clay bed may be substantially freed of the alcohol-ammonia, the naphtha is preferably introduced at the top of the bed at an elevated temperature, for example, of the order of 200° F. to 300° F. During this final washing step the temperature of the clay bed is increased sufficiently to drive off residual alcohol-ammonia by the contained heat of the secondary solvent, i. e., the naphtha. The naphtha withdrawn from the bottom of the clay bed, and containing the color-bodies as well as a small quantity of alcohol-ammonia, may be subjected to fractional distillation whereby the alcohol-ammonia and color-bodies are separated from one another and from the naphtha. The recovered naphtha may then be continuously recirculated, at elevated temperature, through the clay bed until the alcohol-ammonia is substantially removed from the clay. The revivified clay bed may then be employed for the decolorization of additional quantities of hydrocarbon oil. In some instances it may be desirable to remove any residual naphtha from the clay by blowing with steam and/or inert gas such as carbon dioxide or flue gas prior to resuming the filtration operation. Furthermore, prior to effecting revivification of the spent clay, the bulk of the oil retained in the clay at the completion of the filtration operation may be removed by steaming and/or washing with a secondary solvent such as naphtha.

Our process of revivification may be further illustrated by the following comparative examples, in which methyl alcohol, and methyl alcohol containing 5% of dry ammonia were employed as primary solvents. The successive filtration and revivification operations were carried through eight cycles, the steps consisting essentially in filtering a naphtha-diluted residual hydrocarbon oil through a bed of adsorbent clay (fuller's earth) to produce a filtered oil of specified color, then passing the alcohol or alcohol-ammonia solution through the clay bed and finally passing petroleum naphtha therethrough to remove the alcohol and displaced color-bodies. The clay bed was thereafter dried by air blowing and subjected to heating under vacuum to remove traces of solvent prior to resuming the oil filtration. The clay initially used for filtration was arbitrarily designated as being 100% efficient through the 1st cycle, and the comparative efficiencies of the revivified clay is shown for each succeeding cycle.

| Solvent | Cycle (percent of efficiency) | | | | | | | |
|---|---|---|---|---|---|---|---|---|
| | 1 | 2 | 3 | 4 | 5 | 6 | 7 | 8 |
| Methyl alcohol | 100 | 84 | 78 | 75 | 73 | 72 | 72 | 72 |
| Methyl alcohol+5% ammonia | 100 | 93 | 87 | 84 | 81 | 79 | 79 | 79 |

It will be seen from the foregoing description that the preferred embodiment of our process consists essentially in treating a spent adsorbent, which may or may not contain oil, with a primary solvent containing ammonia, which is substantially immiscible with oil and with the impurities, but which is capable of replacing the impurities, i. e., asphaltic, resinous or polymerized bodies, contained in the spent adsorbent. As the second step in our process, the adbsorbent is treated with a secondary solvent which is preferably substantially immiscible with the primary solvent but which is capable of dissolving the replaced impurities. However, we consider it within the scope of our invention to employ primary solvents containing ammonia which may be miscible with the secondary solvents, and which may be employed in admixture.

The employment of a primary solvent of the aforesaid character eliminates to a substantial extent the contamination of the oil therewith, and, since such solvent replaces the impurities in the adsorbent without dissolving same to any substantial extent, the solvent may be continuously re-used without the distillation or other treatment. The employment of a secondary solvent which is substantially immiscible with the primary solvent but which will dissolve replaced impurities, eliminates the mixing or contamination of the primary with the secondary solvent, and, since only the secondary solvent dissolves the impurities to substantial extent, the recovery of solvent by distillation is therefore limited primarily to the secondary solvent. Furthermore, in accordance with our invention, it is not necessary to employ excessive quantities of solvents, since only sufficient primary solvent is required to wet the adsorbent and replace the impurities. And, the quantity of secondary solvent required depends primarily upon its solvent power for the impurities, i. e., the greater the solvent power, the less the solvent required. Moreover, since the secondary solvent is substantially immiscible with the primary solvent and admixing is thus eliminated, the quantity of secondary solvent required to effect the desired degree of removal of impurities is somewhat less than in the case of completely miscible solvent mixtures.

While our process has been described primarily with reference to the use of a primary solvent containing ammonia, we may employ ammonia, per se, followed by washing with a primary and/or secondary solvent. Gaseous ammonia, preferably under pressure, or liquefied ammonia may be advantageously utilized as an agent for displacing or replacing the color-bodies or impurities held in the spent adsorbent material. For example, ammonia under pressure may be brought into contact with spent adsorbent clay which may or may not contain residual oil from the initial filtration operation. The ammonia is preferentially adsorbed by the clay, thereby displacing the color-bodies or impurities held by clay, and the ammonia and color-bodies may then be removed by washing the clay with a solvent for the color-bodies, for example, petroleum naphtha, preferably at an elevated temperature. The resulting revivified clay may, with or without further treatment, be employed in the treatment of additional quantities of oil.

Furthermore, our process of revivification may be applied to a variety of adsorbent or decolorizing media, including adsorbent earths or clays, activated carbon, activated silica and alumina, and various other natural or prepared adsorptive substances.

What we claim is:

1. In a process of revivifying an adsorbent employed in decolorizing hydrocarbon oils, the steps which comprise washing said adsorbent with an organic solvent containing ammonia capable of displacing the impurities held by said adsorbent and with a solvent capable of dissolving said impurities, said first mentioned solvent containing sufficient water to render it substantially immiscible with said second solvent and with hydrocarbon oil.

2. In a process of revivifying an adsorbent employed in decolorizing hydrocarbon oil, the steps which comprise washing said adsorbent with a low boiling alcohol containing ammonia capable of displacing the impurities held by said adsorbent, and then washing said adsorbent with a low boiling petroleum hydrocarbon solvent capable of dissolving said impurities, said low boiling alcohol containing sufficient water to render it substantially immiscible with said low boiling hydrocarbon solvent.

HENRY C. COWLES, Jr.
ARTHUR B. HERSBERGER.